US012594517B2

(12) United States Patent
Ha et al.

(10) Patent No.: US 12,594,517 B2
(45) Date of Patent: Apr. 7, 2026

(54) AIR CLEANER

(71) Applicant: LG ELECTRONICS INC., Seoul (KR)

(72) Inventors: Jiug Ha, Seoul (KR); Kangeui Cho, Seoul (KR); Sungkyong Han, Seoul (KR); Sehwan Bae, Seoul (KR); Myungwhoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 789 days.

(21) Appl. No.: 17/917,745

(22) PCT Filed: Mar. 15, 2021

(86) PCT No.: PCT/KR2021/003153
§ 371 (c)(1),
(2) Date: Oct. 7, 2022

(87) PCT Pub. No.: WO2021/206300
PCT Pub. Date: Oct. 14, 2021

(65) Prior Publication Data
US 2023/0158435 A1      May 25, 2023

(30) Foreign Application Priority Data

Apr. 8, 2020      (KR) ........................ 10-2020-0042860

(51) Int. Cl.
*B01D 46/00*          (2022.01)
*B01D 46/24*          (2006.01)
(Continued)

(52) U.S. Cl.
CPC ......... *B01D 46/0049* (2013.01); *B01D 46/24* (2013.01); *B01D 46/58* (2022.01);
(Continued)

(58) Field of Classification Search
None
See application file for complete search history.

(56) References Cited

U.S. PATENT DOCUMENTS 6,233,138 B1 *  5/2001  Osgood ................. G06F 1/1679
                                                          248/920
6,435,962 B1 *  8/2002  Herron ................... F24F 13/15
                                                          454/325
(Continued)

FOREIGN PATENT DOCUMENTS

CN          1704690 A      12/2005
CN      109520108 A        3/2019
(Continued)

OTHER PUBLICATIONS

Illinois Pulley and Gear (IPG), "Rack and Pinion Gears: Guide & Applications", Jun. 18, 2024, Illinois Pulley and Gear, all pages https://web.archive.org/web/20250426013652/https://illinoispul-leyandgear.com/blogs/blog/rack-and-pinion-gears-guide-applications (Year: 2024).*
(Continued)

*Primary Examiner* — Brit E. Anbacht
(74) *Attorney, Agent, or Firm* — Birch, Stewart, Kolasch & Birch, LLP

(57) ABSTRACT

Disclosed is an air cleaner, more specifically, an air cleaner including a blower that inhales air from the outside, filters the inhaled air, and discharges the filtered air, a flow adjusting device disposed on the blower to inhale the air discharged from the blower, adjust a discharge direction of the inhaled air, and discharge the air, and a guide member disposed below the flow adjusting device to change a state of the flow adjusting device. The guide member may include a plurality of gears arranged inside the guide member to be rotatable, some of the plurality of gears may be connected to each other to be rotatable in engagement with each other, (Continued)

and the flow adjusting device may change the discharge direction of the air by rotations of the plurality of gears of the guide member.

20 Claims, 7 Drawing Sheets

(51) Int. Cl.
   *B01D 46/58* (2022.01)
   *F24F 8/108* (2021.01)
   *F24F 13/14* (2006.01)

(52) U.S. Cl.
   CPC .......... *F24F 8/108* (2021.01); *F24F 13/1426* (2013.01); *F24F 2013/1433* (2013.01); *F24F 2013/1446* (2013.01)

(56) References Cited

U.S. PATENT DOCUMENTS

| | | | | |
|---|---|---|---|---|
| 7,241,326 | B2 | 7/2007 | Han et al. | |
| 11,408,617 | B2 | 8/2022 | Jung et al. | |
| 11,525,589 | B2 * | 12/2022 | Son | F24F 8/10 |
| 2005/0081556 | A1 * | 4/2005 | Kim | F24F 8/22 |
| | | | | 62/411 |
| 2007/0093196 | A1 * | 4/2007 | Morse | F24F 13/10 |
| | | | | 454/290 |
| 2009/0149123 | A1 * | 6/2009 | Blagg | F24F 11/76 |
| | | | | 454/258 |
| 2017/0246570 | A1 * | 8/2017 | Park | B01D 46/24 |
| 2017/0246572 | A1 * | 8/2017 | Park | F24F 8/80 |
| 2017/0246576 | A1 * | 8/2017 | Jung | B01D 46/24 |
| 2017/0246578 | A1 * | 8/2017 | Jung | B01D 46/24 |
| 2017/0246579 | A1 * | 8/2017 | Mun | B01D 46/0008 |
| 2017/0246580 | A1 * | 8/2017 | Bae | F24F 8/108 |
| 2017/0246581 | A1 * | 8/2017 | Jung | F24F 8/10 |
| 2017/0246582 | A1 * | 8/2017 | Park | F24F 8/80 |
| 2017/0248153 | A1 * | 8/2017 | Park | F04D 29/703 |
| 2017/0248339 | A1 * | 8/2017 | Mun | B01D 46/0047 |
| 2018/0001248 | A1 * | 1/2018 | Jung | B01D 46/2411 |
| 2018/0328599 | A1 | 11/2018 | Lin et al. | |
| 2019/0264948 | A1 * | 8/2019 | Jung | A61L 2/22 |
| 2020/0158357 | A1 * | 5/2020 | Son | F04D 25/166 |
| 2021/0278097 | A1 * | 9/2021 | Min | F24F 13/20 |
| 2022/0008855 | A1 * | 1/2022 | Yang | F24F 8/10 |
| 2022/0008856 | A1 * | 1/2022 | Yang | B01D 46/0049 |
| 2022/0010991 | A1 * | 1/2022 | Yang | F24F 8/80 |
| 2022/0011009 | A1 * | 1/2022 | Lee | F24F 13/20 |
| 2022/0011011 | A1 * | 1/2022 | Yang | F24F 13/082 |
| 2022/0032222 | A1 * | 2/2022 | Park | B01D 46/42 |
| 2022/0161176 | A1 * | 5/2022 | Kim | B01D 46/0013 |
| 2022/0186950 | A1 * | 6/2022 | Park | F24F 13/28 |
| 2022/0401867 | A1 * | 12/2022 | Mun | A61L 9/22 |
| 2023/0158435 | A1 * | 5/2023 | Ha | F24F 8/108 |
| | | | | 55/411 |
| 2024/0017199 | A1 * | 1/2024 | Lee | F24F 8/10 |
| 2024/0019142 | A1 * | 1/2024 | Lee | B01D 46/0086 |
| 2024/0035702 | A1 * | 2/2024 | Lee | F24F 8/80 |
| 2024/0255002 | A1 * | 8/2024 | Park | F01P 7/16 |

FOREIGN PATENT DOCUMENTS

| | | | | |
|---|---|---|---|---|
| CN | 109804202 | A | 5/2019 | |
| CN | 110470045 | A | 11/2019 | |
| CN | 111256233 | A * | 6/2020 | F24F 8/80 |
| EP | 3 211 343 | A1 | 8/2017 | |
| KR | 10-2004-0106057 | A | 12/2004 | |
| KR | 20-2010-0006577 | U | 6/2010 | |
| KR | 10-2010-0124454 | A | 11/2010 | |
| KR | 10-2019-0096163 | A | 8/2019 | |
| KR | 10-2019-0106453 | A | 9/2019 | |
| KR | 20220028402 | A * | 3/2022 | B01D 46/0047 |
| WO | WO 2019/172695 | A1 | 9/2019 | |
| WO | WO-2021201334 | A1 * | 10/2021 | F24F 11/79 |

OTHER PUBLICATIONS

WO-2021201334-A1 abstract (Year: 2025).*

* cited by examiner

【Figure 1】
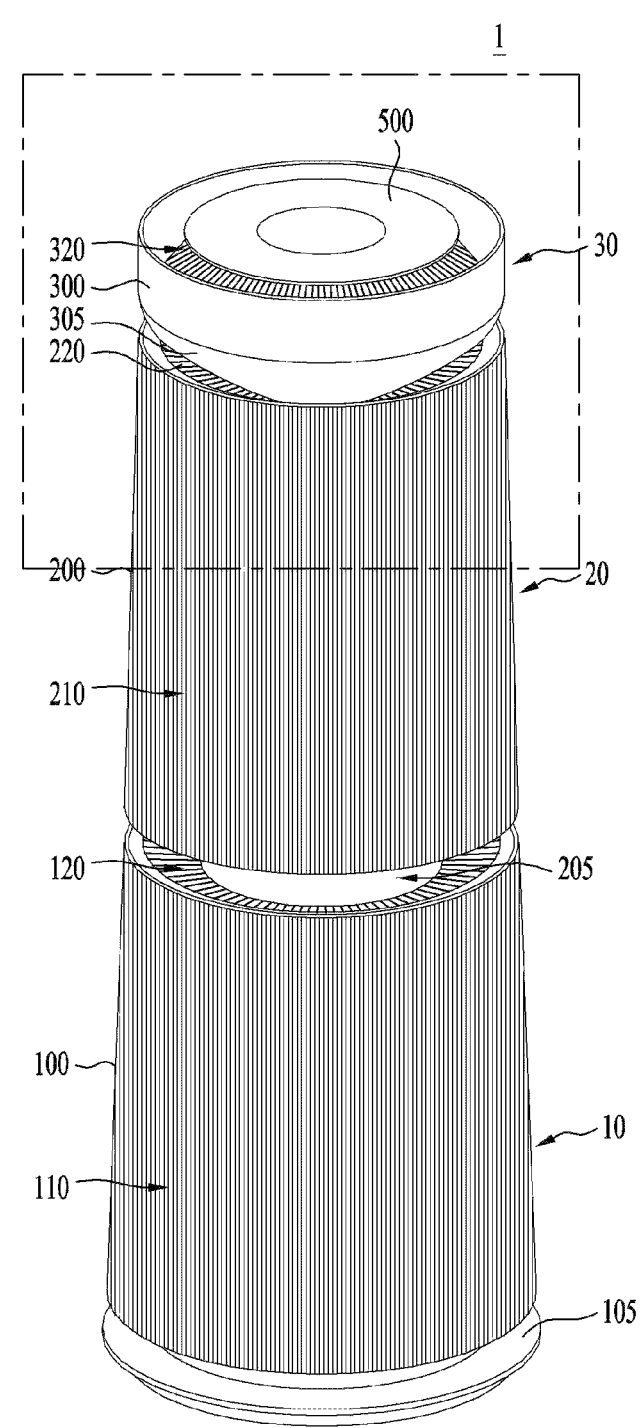

【Figure 2】
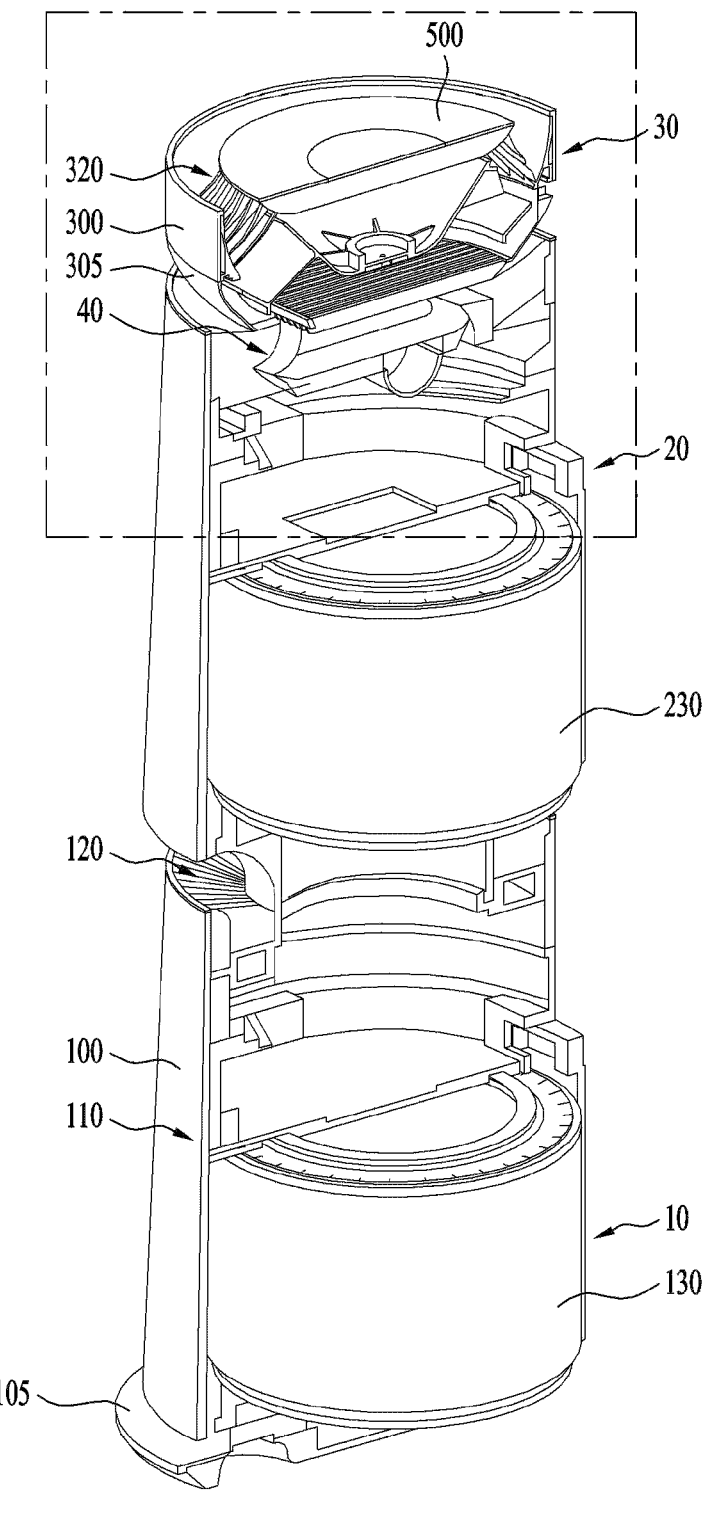

【Figure 3】
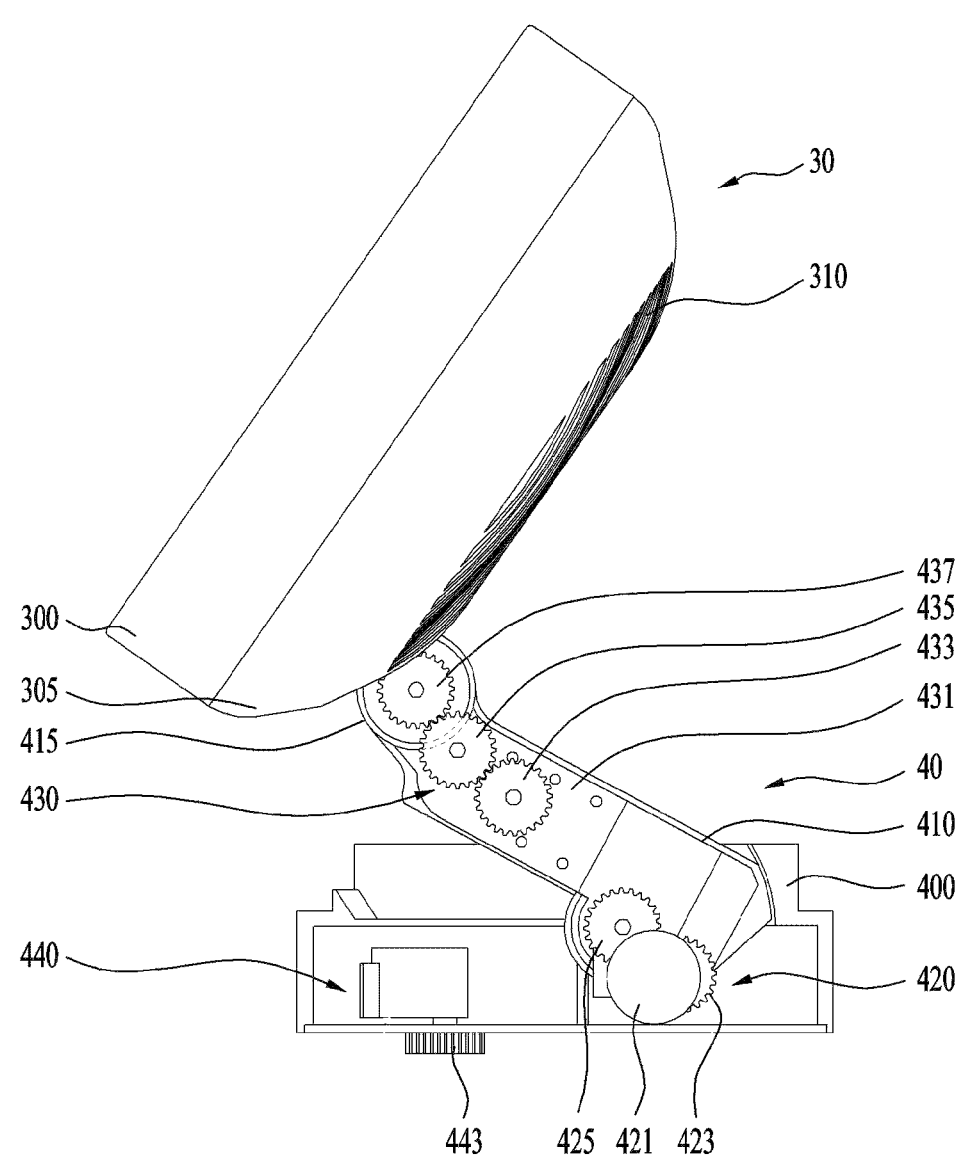

【Figure 4】
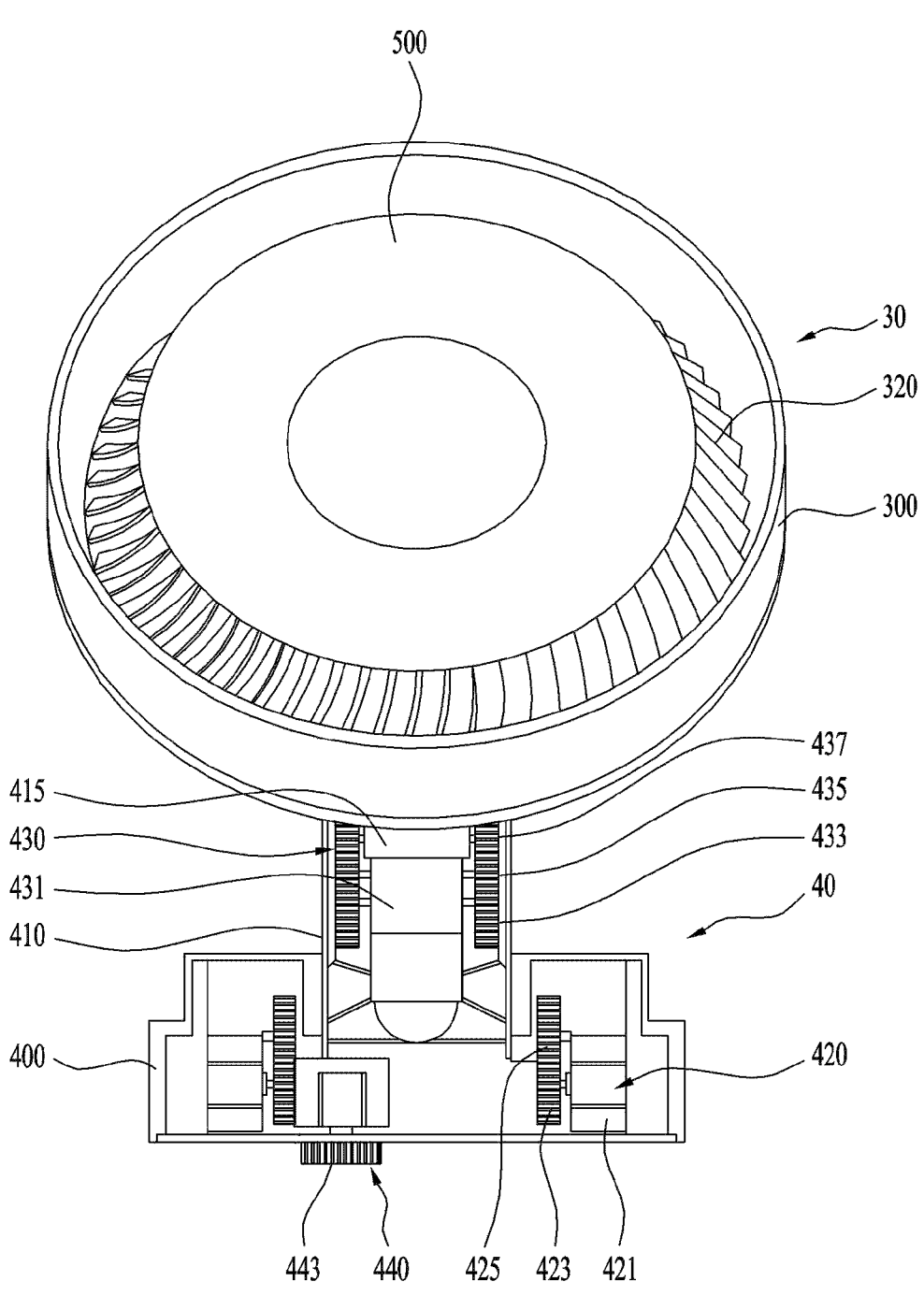

【Figure 5】
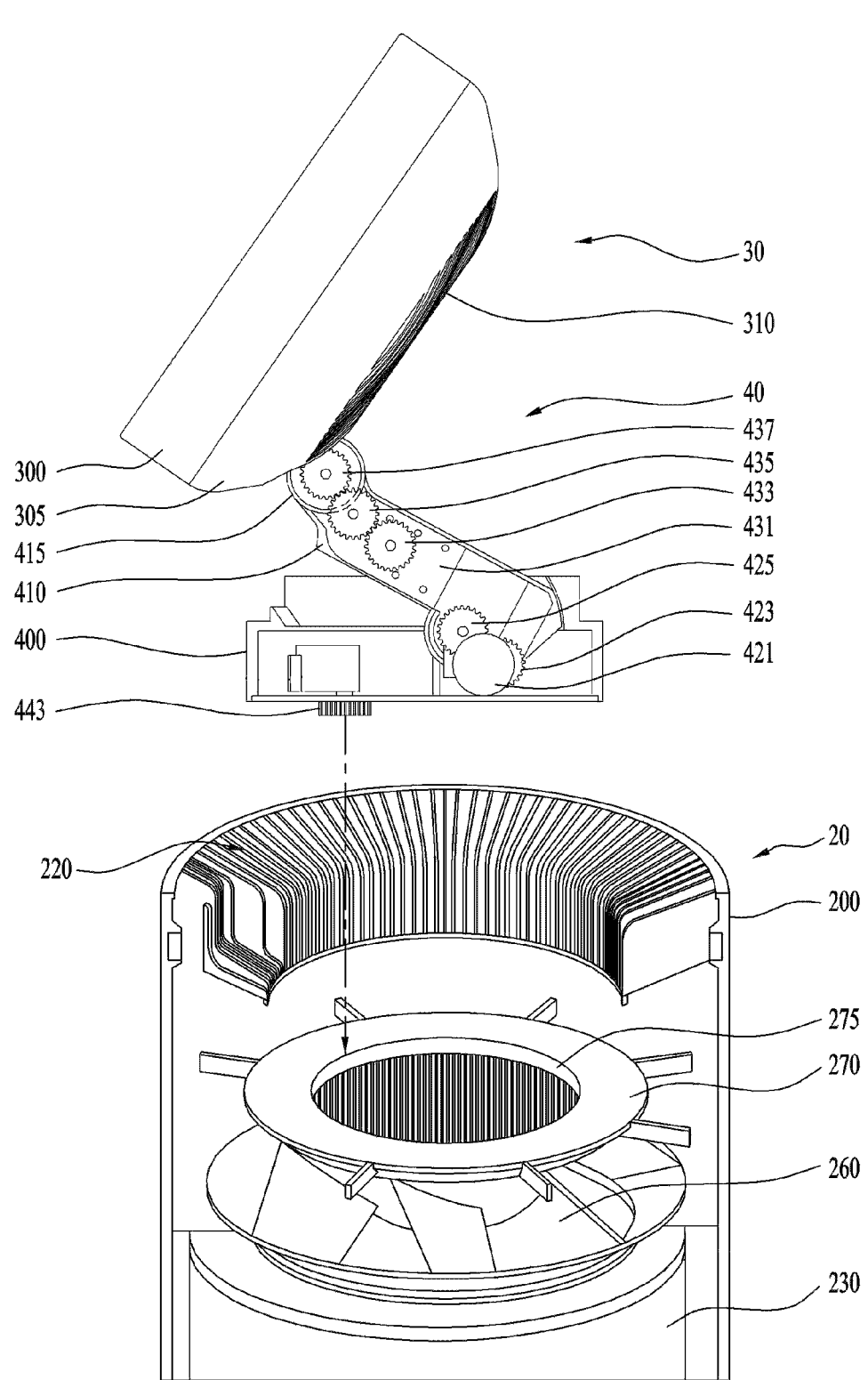

【Figure 6】
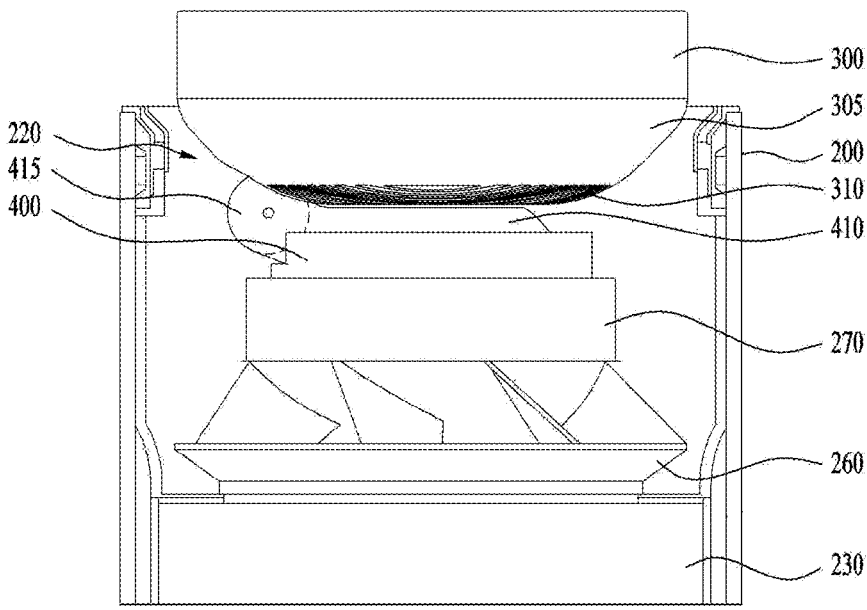
【Figure 7】
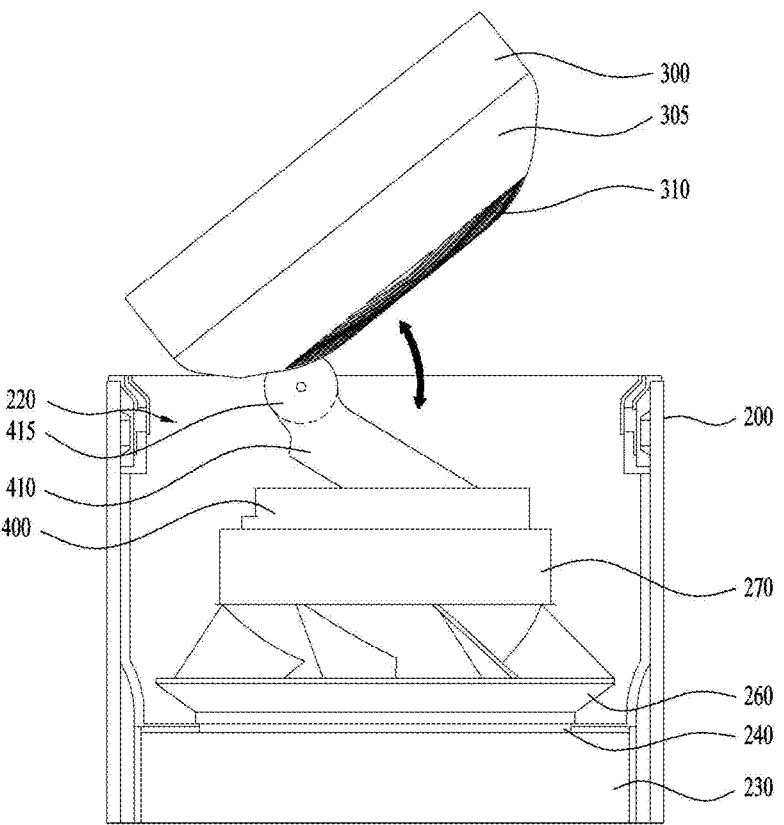

【Figure 8】
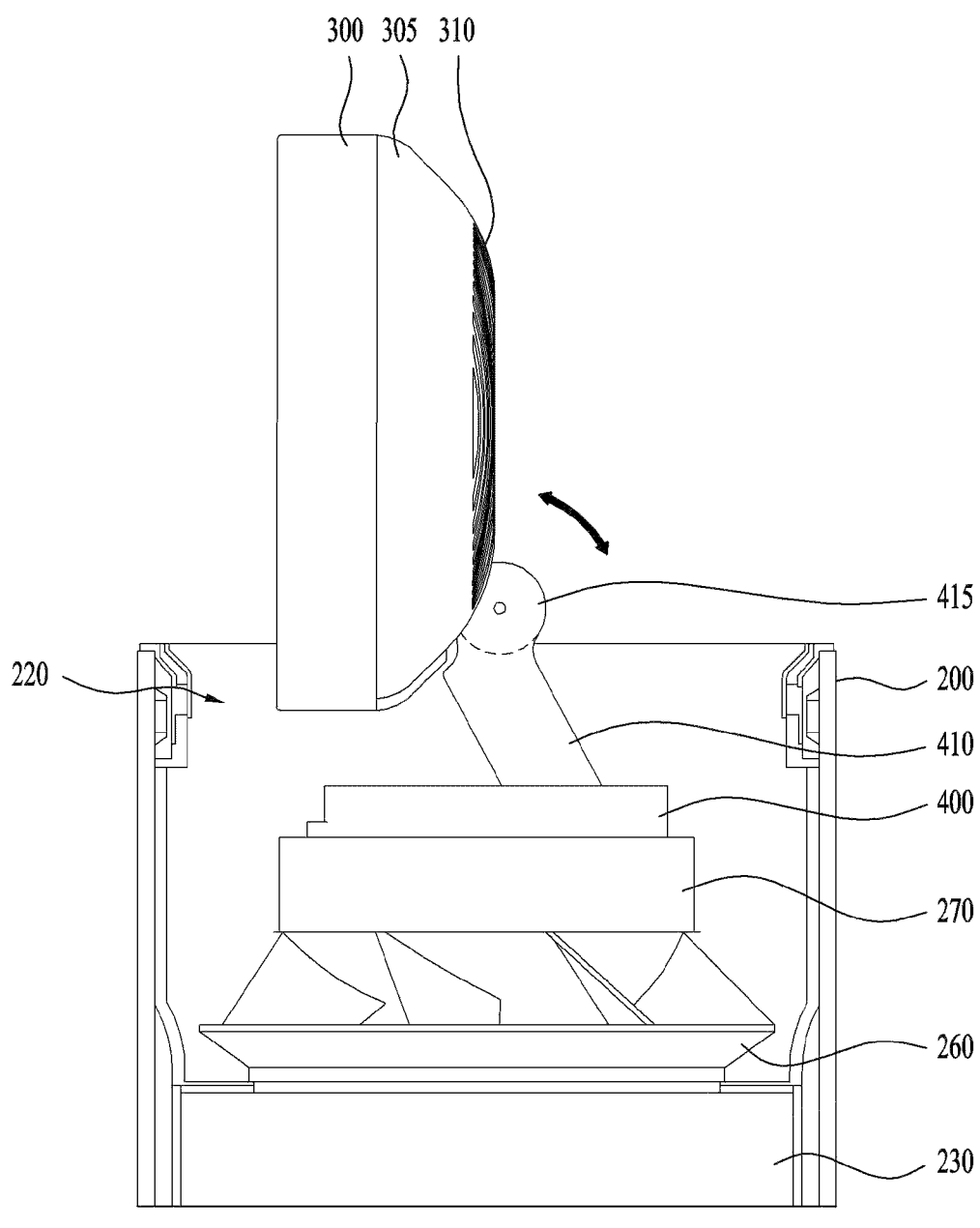

AIR CLEANER

CROSS REFERENCE TO RELATED APPLICATIONS

This application is the National Phase of PCT International Application No. PCT/KR2021/003153, filed on Mar. 15, 2021, which claims priority under 35 U.S.C. 119(a) to Patent Application No. 10-2020-0042860, filed in the Republic of Korea on Apr. 8, 2020, all of which are hereby expressly incorporated by reference into the present application.

TECHNICAL FIELD

The present disclosure relates to an air cleaner.

BACKGROUND ART

An air cleaner is understood as an appliance that inhales and filters contaminated air and then discharges the filtered air, and is configured to purify an indoor space such as a home or an office. Generally, the air cleaner includes a blower configured to inhale external air and discharge the inhaled air, and a filter disposed inside the blower to filter dust, bacteria, and the like in the air. In this connection, the air cleaner may further include a flow adjusting device configured to adjust a discharge direction of the air discharged from the blower. However, because an operating radius of the flow adjusting device is limited, air is not able to be blown in a desired direction.

Prior art (Korean Patent Application Publication No. 10-2017-0101100, hereinafter, referred to as prior art 1) discloses an air cleaner further including the flow adjusting device configured to adjust the discharge direction of the air discharged from the blower. In the air cleaner of the prior art 1, the air inhaled into the blower is filtered by the filter disposed inside the blower and then discharged in a vertical direction perpendicular to a top surface of the blower. Thereafter, the air discharged from the blower is blown in a direction other than the vertical direction through the flow adjusting device.

However, even with the air cleaner of the prior art 1, there is an inconvenience that the air discharged from the blower is only blown in the vertical direction or in a direction forming a predetermined angle with respect to the top surface of the blower, but is not able to be blown in a horizontal direction parallel to the top surface of the blower.

Another prior art (Korean Patent Application Publication No. 10-2019-0120126, hereinafter, referred to as prior art 2) discloses an air cleaner that includes the flow adjusting device configured to adjust the discharge direction of the air discharged from the blower, and a rotation guide configured to induce rotation of the flow adjusting device. In the air cleaner of prior art 2, a position of the flow adjusting device may be changed based on a degree of withdrawal of the rotation guide, and the air discharged from the blower may be blown in a direction other than the vertical direction through the flow adjusting device based on the degree of withdrawal of the rotation guide.

However, even with the air cleaner of prior art 2, because a space defined inside the blower in which the rotation guide may be disposed is limited, a length of the rotation guide for changing a state to reach a state in which a top surface of the flow adjusting device is vertical to the top surface of the blower is not able to be secured. Accordingly, there is a limit in that it is difficult to blow the air discharged from the blower in the desired direction.

DISCLOSURE OF INVENTION

Technical Problem

One of various tasks of the present disclosure is to provide an air cleaner that may discharge filtered air in a horizontal direction parallel to a top surface of a blower.

One of various tasks of the present disclosure is to provide an air cleaner including a flow adjusting device that allows orientation change from a state in which a top surface of the flow adjusting device is horizontal with a top surface of a blower to a state in which the top surface of the flow adjusting device is perpendicular to the top surface of the lower.

Solution to Problem

An air cleaner according to exemplary embodiments of the present disclosure may include a blower that inhales air from the outside, filters the inhaled air, and discharges the filtered air, a flow adjusting device disposed on the blower to inhale the air discharged from the blower, adjust a discharge direction of the inhaled air, and discharge the air, and a guide member disposed below the flow adjusting device to change a state of the flow adjusting device. The guide member may include a plurality of gear boxes. An angle formed between a top surface of the flow adjusting device and a top surface of the blower may increase or decrease based on operations of the plurality of gear boxes, so that the orientation of the flow adjusting device may be changed from a state in which the top surface of the flow adjusting device is horizontal with the top surface of the blower to a state in which the top surface of the flow adjusting device is perpendicular to the top surface of the blower.

An air cleaner according to exemplary embodiments of the present disclosure may include a blower that inhales air from the outside, filters the inhaled air, and discharges the filtered air, a flow adjusting device disposed on the blower to inhale the air discharged from the blower, adjust a discharge direction of the inhaled air, and discharge the air, and a guide member disposed below the flow adjusting device to change a state of the flow adjusting device. The guide member may include a plurality of gears arranged inside the guide member and rotatable, some of the plurality of gears may be connected to each other to be rotatable in engagement with each other, and the flow adjusting device may change the discharge direction of the air by rotations of the plurality of gears of the guide member.

The flow adjusting device may be oriented to be in a first position, a second position, and a third position based on an operation of the guide member, the first position may be a state where a top surface of the flow adjusting device is horizontal with a top surface of the blower, the second position may be a state where the top surface of the flow adjusting device has a predefined angle with respect to the top surface of the blower, and the third position may be a state where the top surface of the flow adjusting device is perpendicular to the top surface of the blower.

The guide member may include a first housing disposed on the top surface of the blower, a second housing coupled to the first housing to ascend and descend, a guide connector disposed to pivot by being coupled to the bottom surface of the flow adjusting device and a portion of the second housing, a housing gear assembly disposed inside the first housing to connect the first housing and the second housing with each other, and including a plurality of housing gears that are rotatable, and a guide gear assembly disposed inside the second housing to connect the second housing and the flow adjusting device with each other, and including a plurality of guide gears that are rotatable. The flow adjusting device may be controlled to ascend or descend by the housing gear assembly, and the flow adjusting device may be controlled to pivot about the guide connector by the guide gear assembly.

The housing gear assembly may include a housing actuator disposed inside the first housing, a first housing gear that rotates by the housing actuator, and a second housing gear that rotates in engagement with the first housing gear.

The first housing gear and the second housing gear may be controlled to rotate in opposite directions to each other.

The second housing gear may be coupled to the second housing, and as the second housing gear rotates, the second housing may be controlled to pivot in the same direction as the second housing gear rotates.

The flow adjusting device may be coupled to one end of the second housing, and the second housing gear may be coupled adjacent to the other end of the second housing.

The second housing may be controlled to pivot about the second housing gear, and accordingly, the flow adjusting device may be controlled to ascend or descend.

The guide gear assembly may include a guide actuator disposed inside the second housing, a first guide gear that rotates by the guide actuator, and a second guide gear that rotates in engagement with the first guide gear.

The first guide gear and the second guide gear may be controlled to rotate in opposite directions to each other.

The second guide gear may be coupled to the guide connector, and as the second guide gear rotates, the guide connector may be controlled to rotate in the same direction as the second guide gear rotates.

The flow adjusting device may be coupled to a side wall of the guide connector, and the guide connector may be controlled to rotate about the second guide gear, so that the flow adjusting device may be controlled to be oriented in the first position to the third position.

The guide gear assembly may further include an idler gear disposed between the first guide gear and the second guide gear to rotate in engagement with the first guide gear and the second guide gear.

The first guide gear and the second guide gear may be controlled to rotate in the same direction with each other.

The housing gear assembly and the guide gear assembly may be controlled to operate simultaneously.

The blower may include a guide member seating portion for seating the first housing of the guide member thereon, and the guide member seating portion may have a shape of a ring having a central portion penetrated in the plan view.

The guide member may further include a direction adjusting gear assembly disposed inside the first housing to connect the first housing and the blower with each other, and including a direction adjusting gear that is rotatable in a different direction from the plurality of housing gears and the plurality of guide gears, and the direction adjusting gear may be controlled to move along an inner circumferential surface of the guide member seating portion.

A guide ring may be disposed on the inner circumferential surface of the guide member seating portion such that the direction adjusting gear is rotatable in engagement with the guide ring, and the direction adjusting gear may be controlled to move along the guide ring.

The flow adjusting device may be controlled to move along the inner circumferential surface of the guide member seating portion by the direction adjusting gear assembly.

The blower may include a first blower configured to inhale, filter, and blow air at a relatively low vertical level, and a second blower disposed on the first blower and configured to inhale, filter, and blow air at a relatively high vertical level. The first blower may include a first casing for defining appearance of the first blower, a first filter member disposed in a lower portion of an interior of the first casing to filter the air, and a first blow fan disposed in an upper portion of the interior of the first casing to generate air flow. The second blower may include a second casing for defining appearance of the second blower, a second filter member disposed in a lower portion of an interior of the second casing to filter the air, and a second blow fan disposed in an upper portion of the interior of the second casing to generate air flow. In addition, the guide member may be disposed between the second blow fan and the flow adjusting device.

Advantageous Effects of Invention

The air cleaner according to exemplary embodiments of the present disclosure may include the sequentially stacked blowers, the guide member, and the flow adjusting device, and the guide member may include the plurality of gears arranged inside the guide member and configured to be rotatable. Some of the plurality of gears may be connected to each other to be rotatable in engagement with each other. The flow adjusting device may be configured to change the discharge direction of the air by the rotations of the plurality of gears of the guide member.

In this connection, the angle formed between the top surface of the flow adjusting device and the top surface of the blower may increase or decrease based on the operations of the plurality of links, so that the orientation of the flow adjusting device may be changed from the orientation in which the top surface of the flow adjusting device is horizontal with the top surface of the blower to the orientation in which the top surface of the flow adjusting device is perpendicular to the top surface of the blower.

Therefore, the top surface of the flow adjusting device may be oriented to be perpendicular to the top surface of the blower. Thus, the air discharged from the blower may be blown farther away in the desired direction through the flow adjusting device.

In addition, the guide member according to exemplary embodiments of the present disclosure may have a stable and improved appearance because, compared to a driving scheme of the conventional guide member configured to be movable by being inserted into the blower or withdrawn from the top surface of the blower, not only more concise and natural driving is possible, but also a structure for driving the guide member is not exposed to the outside.

BRIEF DESCRIPTION OF DRAWINGS

FIGS. 1 and 2 are diagrams for illustrating an air cleaner according to exemplary embodiments of the present disclosure.

FIGS. 3 and 4 are diagrams for illustrating a flow adjusting device and a guide member according to exemplary embodiments of the present disclosure.

FIG. 5 is a diagram for describing a coupling structure of a blower and a guide member according to exemplary embodiments of the present disclosure.

FIGS. 6 to 8 are diagrams for illustrating a state change of a flow adjusting device based on an operation of a guide member according to exemplary embodiments of the present disclosure.

BEST MODE FOR CARRYING OUT THE INVENTION

Hereinafter, specific embodiments of the present disclosure will be described with reference to the drawings. The following detailed description is configured to aid in a comprehensive understanding of methods, devices and/or systems described herein. However, this is only an example, and the present disclosure is not limited thereto.

In describing the embodiments of the present disclosure, when it is determined that a detailed description of the publicly known technology related to the present disclosure may unnecessarily obscure the subject matter of the present disclosure, the detailed description will be omitted. In addition, terminologies to be described later are terminologies defined in consideration of functions in the present disclosure, which may vary depending on an intention of a user or an operator, customs, or the like. Therefore, the definitions of the terminologies should be made based on the contents throughout the specification. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

In addition, in describing components of the embodiment of the present disclosure, terminologies such as first, second, A, B, (a), (b), and the like may be used. These terminologies are only used to distinguish the component from other components, and the nature, order, or order of the corresponding component is not limited by the terminology.

Hereinafter, a direction perpendicular to a ground is defined as a vertical direction. A direction parallel to the ground and perpendicular to the vertical direction is defined as a horizontal direction. A circumferential direction is defined as a virtual circular direction that is formed when an object rotates around the vertical direction at a rotation radius as a length of the horizontal direction.

FIGS. 1 and 2 are diagrams for illustrating an air cleaner according to exemplary embodiments of the present disclosure. Specifically, FIG. 1 is a diagram for illustrating an overall structure of an air cleaner, and FIG. 2 is a diagram for illustrating a component of the air cleaner.

Referring to FIGS. 1 and 2, an air cleaner 1 according to exemplary embodiments of the present disclosure may include a blower 10 and 20 configured to inhale air from the outside, and filter the inhaled air and discharge the filtered air, a flow adjusting device 30 disposed on the blower 10 and 20 and configured to inhale the air discharged from the blower 10 and 20, and adjust a discharge direction of the inhaled air, and a guide member 40 disposed between the blower 10 and 20 and the flow adjusting device 30, wherein one end thereof is connected to the blower 30 and the other end is connected to air the discharge assembly 30, wherein the guide member 40 is configured to induce a state change of the flow adjusting device 30.

The blower 10 and 20 includes a first blower 10 configured to inhale, filter, and blow air at a relatively low vertical level, and a second blower 20 disposed on the first blower 10 and configured to inhale, filter, and blow air at a relatively high vertical level. The first blower 10 and the second blower 20 may be stacked in the vertical direction, and may be fastened to each other via a variety of manners, such as fitting fastening, rivet fastening, and screw fastening.

The flow adjusting device 30 may be disposed on the second blower 20. The guide member 40 may be configured to be connected to the second blower 20 and the flow adjusting device 30. The guide member 40 and the second blower 20 may be fastened to each other via a variety of methods, such as fitting fastening, rivet fastening, and screw fastening. The guide member 40 and the flow adjusting device 30 may be fastened to each other via various methods such as fitting fastening, rivet fastening, and screw fastening.

In one example, FIG. 1 shows that the blower 10 and 20 include the first blower 10 and the second blower 20 sequentially stacked along the vertical direction. However, a concept of the present disclosure is not necessarily limited thereto. A blower may include only one blower.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200 to filter air, and a second blow fan 260 disposed in an upper portion of the interior of the second casing 200 to generate air flow.

In exemplary embodiments, each of the first casing 100 and the second casing 200 may have a truncated conical shape, or a cylinder shape having a diameter that gradually decreases as it extends upwardly.

The first blower 10 may further include a first base 105 disposed in the lower portion of the first blower 10. The first base 105 may be disposed on a ground and configured to support the first blower 10. The first base 105 may include a lower portion configured to contact the ground and an upper portion extending in the vertical direction from the lower portion and at least partially covered by the first casing 100. In one example, although not shown, a first lower inhale hole communicating with the interior of the first blower 10 may be further defined in a space between an inner wall of the first casing 100 and the upper portion of the first base 105. Accordingly, outside air may be inhaled into the interior of the first blower 10 through the first lower inhale hole.

The second blower 20 may further include a second base 205 disposed in the lower portion of the first blower 20. The second base 205 may be disposed on the first blower 10 and configured to support the second blower 20. The second base 205 may include a lower portion configured to contact the first blower 10 and an upper portion extending in the vertical direction from the lower portion and at least partially covered by the second casing 200. In one example, although not shown, a second lower inhale hole communicating with the interior of the second blower 20 may be disposed in a space between an inner wall of the second casing 100 and the upper portion of the second base 205, Accordingly, outside air may be inhaled into the interior of the second blower 20 through the second lower inhale hole.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100.

The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

A first discharge hole 120 configured to discharge air to the outside may be defined in the top surface of the first blower 10. The first discharge hole 120 may include a plurality of through-holes passing through at least a portion of the top surface of the first blower 10. Further, a second discharge hole 220 configured to discharge air to the outside may be defined in a top surface of the second blower 20. The second discharge hole 220 may include a plurality of through-holes passing through at least a portion of a top surface of the second blower 20.

The first discharge hole 120 may be configured to have a line shape extending from a distal portion of the top surface of the first blower 10 to a portion adjacent to a central region thereof. The plurality of first discharge holes 120 may be defined in the top surface of the first blower 10. The plurality of first discharge holes 120 may be evenly arranged to surround a portion of the top surface of the first blower 10 other than a portion in which the second base 205 is disposed. Further, the second discharge hole 220 may be configured to have a line shape extending from the distal portion of the top surface of the second blower 20 to a portion adjacent to a central region thereof. The plurality of second discharge holes 220 may defined in the top surface of the second blower 20. The plurality of second discharge holes 220 may be evenly arranged to surround a portion of the top surface of the second blower 20 other than a portion in which the guide member 40 is disposed.

In exemplary embodiments, in the plan view, a collection of the plurality of first discharge holes 120 may form a ring shape covering an outer peripheral region of the top surface of the first blower 10. A collection of the plurality of second discharge holes 220 may form a ring shape covering an outer peripheral region of the top surface of the second blower 20. In one embodiment, the ring shape defined by the collection of the plurality of first discharge holes 110 may have an outer portion having a higher vertical level than an inner portion thereof. The ring shape defined by the collection of the plurality of second discharge holes 210 may have an outer portion having a higher vertical level than an inner portion thereof.

The top surface of the first blower 10 may include an outer peripheral region in which the plurality of first discharge holes 120 are disposed and a central region in which the second base 205 is disposed. The top surface of the second blower 20 may include an outer peripheral region in which the plurality of second discharge holes 220 are disposed and a central region in which the guide member 40 is disposed. In this connection, the central region of the top surface of the first blower 10 may have a lower vertical level than the outer peripheral region thereof. The central region of the top surface of the second blower 20 may have a lower vertical level than the outer peripheral region thereof.

Hereinafter, the top surface of the first blower 10 is defined to refer only to the central region in which the second base 205 is disposed, except the outer peripheral region in which the plurality of first discharge holes 120 are disposed. The top surface of the second blower 20 is defined to refer only to the central region in which the guide member 40 is disposed, except the outer peripheral region in which the plurality of second discharge holes 220 are disposed. In exemplary embodiments, each of the top surface of the first blower 10 and the top surface of the second blower 20 may have a flat surface extending in the horizontal direction.

The flow adjusting device 30 may include a rear casing which forms an appearance and is configured to define a rear surface of the flow adjusting device 30, and which includes an inhale grill configured to inhale air discharged from the blower 10 and 20. The flow adjusting device 30 may include a front casing 300 fastened to the rear casing and configured to define a front surface of the flow adjusting device 30. The front casing 300 may include a discharge grill 320 configured to discharge air inhaled through the inhale grill. The rear casing includes a rear panel 310 defining the rear surface of the flow adjusting device 30, and a side panel 305 extending from the rear panel 310 to the front casing 300 to define a side surface of the flow adjusting device 30. The rear panel 310 of the rear casing 300 may be configured to perform the role of the inhale grill. That is, a combination of the side panel 305 and the rear panel 310 may form the rear casing 300.

The top surface of the flow adjusting device 30 and a side wall of the front casing 300 may be configured to be spaced apart from each other. The discharge grill 320 may be disposed in a space between the top surface of the flow adjusting device 30 and the side wall of the front casing 300 to discharge air to the outside. The discharge grill 320 may have a structure surrounding the top surface of the flow adjusting device 30 in the plan view. Accordingly, the air inhale may be executed in any direction around the top surface of the flow adjusting device 30. In exemplary embodiments, one side of the discharge grill 320 may be connected to the top surface of the flow adjusting device 30, while the other side of the discharge grill 320 may be connected to the inner wall of the front casing 300.

The guide member may include a plurality of links having different lengths. An angle formed by the top surface of the flow adjusting device 30 and the top surface of the blower 10 and 20 may increase or decrease based on an operation of the plurality of links, so that a state of the flow adjusting device 30 may be changed from a state in which the top surface of the flow adjusting device 30 is horizontal with the top surface of the blower 10 and 20 to a state in which the top surface of the flow adjusting device 30 is perpendicular to the top surface of the blower 10 and 20. A detailed description of this will be described later with reference to FIGS. 6 to 8.

In exemplary embodiments, based on the operation of the guide member 40, the flow adjusting device 30 may be oriented in a first position in which the top surface of the flow adjusting device 30 is horizontal with the top surface of the second blower 20, may be oriented in a second position in which the top surface of the flow adjusting device 30 has a predefined angle with respect to the top surface of the second blower 20, and may be oriented in a third position in which the top surface of the flow adjusting device 30 is perpendicular to the top surface of the second blower 20.

In one example, FIGS. 1 and 2 respectively show that the flow adjusting device 30 is oriented in the first position. A detailed description of a configuration in which the flow adjusting device 30 is oriented in the second position and the third position will be described later.

FIGS. 3 and 4 are diagrams for illustrating a flow adjusting device and a guide member according to exemplary embodiments of the present disclosure. Specifically, FIG. 3 is a diagram of an internal structure of the guide member viewed from the side, and FIG. 4 is a diagram of the internal structure of the guide member viewed from the front.

Referring to FIGS. 3 and 4, the flow adjusting device 30 may include the front casing 300 that defines the front surface of the flow adjusting device 30, the side panel 305 that defines the side surface of the flow adjusting device 30 and has a shielded structure to prevent air from entering from the outside, the rear panel 310 that defines the rear surface of the flow adjusting device 30 and serves as the inhale grill, and a third blow fan (not shown) disposed between the front casing 300 and the rear panel 310 and flowing the air inhaled through the rear panel 310 toward the discharge grill 320. In one embodiment, the flow adjusting device 30 may further include a third filter member (not shown) disposed between the third blow fan and the rear panel 310 so as to be seated on an inner surface of the rear panel 310 to filter the air inhaled through the inhale grill.

A display 500 configured to display driving information and the like of the air cleaner 1 may be disposed on the top surface of the flow adjusting device 30. The flow adjusting device 30 and the display 500 may be configured to operate together. In exemplary embodiments, the display 500 may be configured to partially or completely cover the top surface of the flow adjusting device 30.

The front casing 300 and the rear casing may be fastened to each other at tops thereof via first hook fastening, and may be fastened to each other at bottoms thereof via second hook fastening.

Specifically, the top portion of the side panel 305 may be configured to include a first hook 333. The top portion of the front casing 300 may be configured to include a first counterpart hook (not shown). The top portion of the side panel 305 and the top portion of the front casing 300 may be fastened to each other via fastening between the first hook and the first counterpart hook. Further, the bottom portion of the side panel 305 may be configured to include a pair of second counterpart hooks (not shown) symmetrical to each other in the horizontal direction. The bottom portion of the front casing 300 may be configured to include a pair of second hooks (not shown) disposed at positions corresponding to the second counterpart hooks, respectively. The bottom portion of the side panel 305 and the bottom portion of the front casing 300 may be fastened to each other via fastening between the second counterpart hooks and second hooks. In one embodiment, the bottom portion of the side panel 305 may be configured to further include a magnet (not shown). The bottom portion of the front casing 300 may be configured to further include a magnet counterpart (not shown) made of metal. The coupling between the bottom portion of the side panel 305 and the bottom portion of the front casing 300 may be guided via the coupling between the magnet and the magnet counterpart.

In exemplary embodiments, the rear casing of the flow adjusting device 30 may be configured to be detachable when the flow adjusting device 30 is oriented in the third position. The filter member 350 may be configured to be detachable from the flow adjusting device 30 when the rear casing is separated from the front casing 300.

The guide member 40 disposed below the flow adjusting device 30 and configured to change the orientation of the flow adjusting device 30 may include a plurality of gears 423, 425, 433, 435, 437, and 443. Each of the plurality of gears 423, 425, 433, 435, 437, and 443 may be configured to be rotatable. The flow adjusting device 30 may be configured to change the discharge direction of the air by rotation of at least one of the plurality of gears 423, 425, 433, 435, 437, and 443 of the guide member 40.

Specifically, the guide member 40 may include a first housing 400 disposed on the top surface of the blower 10 and 20, a second housing 410 coupled to the first housing 400 and configured to ascend and descend, a guide connector 415 coupled to a bottom surface of the flow adjusting device 30 and a portion of the second housing 410 and configured to rotate, a housing gear assembly 420 disposed inside the first housing 400 to connect the first housing 400 and the second housing 410 with each other, and including a plurality of housing gears 423 and 425 that are rotatable, and a guide gear assembly 430 disposed inside the second housing 410 to connect the second housing 410 and the flow adjusting device 30 with each other, and including a plurality of guide gears 433, 435, and 437 that are rotatable. The flow adjusting device 30 may be controlled to ascend or descend by the housing gear assembly 420, and the flow adjusting device 30 may be controlled to pivot about the guide connector 415 by the guide gear assembly 430.

The flow adjusting device 30 and the guide connector 415 may be coupled to each other to operate together, and the bottom surface of the flow adjusting device 30 and a side wall of the guide connector 415 may be fastened to each other and fixed via a variety of methods, such as fitting fastening, rivet fastening, and screw fastening.

In exemplary embodiments, a space in which the second housing 410 may be accommodated may be defined inside the first housing 400. The space inside the first housing 400 may be defined to have a larger volume than the second housing 410 so as not to collide with an inner wall of the first housing 400 when the second housing 410 pivots. In one embodiment, the inner wall of the first housing 400 may have a partially curved portion, and the second housing 410 may be configured to pivot along the curved portion of the inner wall of the first housing 400.

A space in which the housing gear assembly 420 may be accommodated may be defined inside the first housing 400, and a space in which the guide gear assembly 430 may be accommodated may be defined inside the second housing 410. The first housing 400 and the second housing 410 may be connected to each other by the housing gear assembly 420, and a space in which the housing gear assembly 420 may be partially accommodated may be further defined inside the second housing.

FIGS. 3 and 4 illustrate that each of the first housing 400, the second housing 410, and the guide connector 415 has a specific shape, but the concept of the present disclosure is not necessarily limited thereto. That is, each of the first housing 400, the second housing 410, and the guide connector 415 may have various shapes within a range that does not impair an original function thereof.

In an exemplary embodiment, when the air cleaner 1 includes the first blower 10 and the second blower 20 sequentially stacked, the guide member 40 may be disposed on the second blower 20, for example, on the second blow fan 260. In one embodiment, when the air cleaner 1 includes only one blower, for example, the first blower 10, the guide member 40 may be disposed on the first blower 10, for example, on the first blow fan 160. Otherwise, when the air cleaner 1 includes only the second blower 20, the guide member 40 may be disposed on the second blower 20, for example, on the second blow fan 260.

The housing gear assembly 420 may include a housing actuator 421 disposed inside the first housing 400, a first housing gear 423 configured to rotate by the housing actuator 421, and a second housing gear 425 configured to rotate in engagement with the first housing gear 423. In this connection, the first housing gear 423 and the second housing gear 425 may be controlled to engage each other and rotate in opposite directions.

The first housing gear 423 may be fastened to a first housing driving shaft (not shown) disposed to protrude from the housing actuator 421, and the first housing gear 423 and the first housing driving shaft may be controlled to rotate together by the housing actuator. In one embodiment, the first housing gear 423 and the first housing driving shaft may be integrally formed.

The second housing gear 425 may be coupled to the second housing 410, and the second housing 410 may be controlled to pivot in the same direction as the second housing gear 425 rotates as the second housing gear 425 rotates. In exemplary embodiments, the second housing gear 425 may be coupled to an outer wall of the second housing 410. In this case, the first housing gear 423 and the second housing gear 425 may be arranged outside the second housing 410. Alternatively, the second housing gear 425 may be coupled to an inner wall of the second housing. In this case, the first housing gear 423 and the second housing gear 425 may be arranged inside the second housing 410. In one example, a portion of the first housing gear 423 may be disposed inside the second housing 410, and the remaining portion of the first housing gear 423 may be disposed outside the second housing 410.

The flow adjusting device 30 may be coupled to one end of the second housing 410, and the second housing gear 425 may be coupled adjacent to the other end of the second housing 410. The second housing 410 may be controlled to pivot about the second housing gear 425 coupled to the other end of the second housing 410. Accordingly, the flow adjusting device 30 coupled to one end of the second housing 410 may be controlled to ascend or descend.

The guide gear assembly 430 may include a guide actuator 431 disposed inside the second housing 410, a first guide gear 433 configured to rotate by the guide actuator 431, and a second guide gear 437 configured to rotate in engagement with the first guide gear 433. In this case, the first guide gear 433 and the second guide gear 437 may be controlled to rotate in opposite directions. In this connection, the second guide gear 437 may be coupled to the guide connector 415. The guide connector 415 may be controlled to rotate in the same direction as a direction in which the second guide gear 437 rotates as the second guide gear 437 rotates.

The flow adjusting device 30 may be coupled to the side wall of the guide connector 415, and the guide connector 415 may be controlled to rotate about the second guide gear 437. Accordingly, the flow adjusting device 30 may be controlled such that the orientation thereof is changed from the orientation in which the top surface of the flow adjusting device 30 is horizontal with the top surface of the blower 10 and 20, that is, the first position to the orientation in which the top surface of the flow adjusting device 30 is perpendicular to the top surface of the blower 10 and 20, that is, the third position.

In exemplary embodiments, the guide gear assembly 430 may further include an idler gear 435 disposed between the first guide gear 433 and the second guide gear 437 and configured to rotate in engagement with the first guide gear 433 and the second guide gear 437. The idler gear 435 may be controlled to rotate in a direction opposite to a direction in which each of the first guide gear 433 and the second guide gear 437 rotates. In one embodiment, when the guide gear assembly 430 further includes the idler gear 435, the first guide gear 433 and the second guide gear 437 may be controlled to rotate in the same direction as each other.

In exemplary embodiments, the housing gear assembly 420 and the guide gear assembly 430 may be controlled to operate simultaneously. That is, in order to change the orientation of the flow adjusting device 30 from the first position to the second position, the flow adjusting device 30 may ascend by the housing gear assembly 420. At the same time, an angle formed between the top surface of the flow adjusting device 30 and the top surface of the blower 10 and 20 may be increased by the guide gear assembly 430. In addition, in order to change the orientation of the flow adjusting device 30 from the second position to the third position, the flow adjusting device 30 may further ascend by the housing gear assembly 420. At the same time, the angle formed between the top surface of the flow adjusting device 30 and the top surface of the blower 10 and 20 may be further increased by the guide gear assembly 430.

FIG. 5 is a diagram for describing a coupling structure of a blower and a guide member according to exemplary embodiments of the present disclosure.

In addition, in order to change the orientation of the flow adjusting device 30 from the second position to the third position, the flow adjusting device 30 may further ascend by the housing gear assembly 420. At the same time, the angle formed between the top surface of the flow adjusting device 30 and the top surface of the blower 10 and 20 may be further increased by the guide gear assembly 430.

In this connection, a guide ring 275 may be disposed on an inner circumferential surface of a guide member seating portion 270 such that a direction adjusting gear 443 is rotatable in engagement with the guide ring 275. Further, the direction adjusting gear 443 may be controlled to move along the guide ring 275. Therefore, the flow adjusting device 30 may be controlled to move along the inner circumferential surface of the guide member seating portion 270, that is, the guide ring 275 by a direction adjusting gear assembly 440. The air discharge direction of the flow adjusting device 30 may be formed evenly in the circumferential direction along the outer circumferential surface of the blower casing 100 and 200.

FIGS. 6 to 8 are diagrams for illustrating a state change of a flow adjusting device based on an operation of a guide member according to exemplary embodiments of the present disclosure. Specifically, FIG. 6 is a diagram for illustrating an operation of the guide member in a state in which the flow adjusting device is oriented in the first position, FIG. 7 is a diagram for illustrating an operation of the guide member in a state in which the flow adjusting device is oriented in the second position, and FIG. 8 is a diagram for illustrating an operation of the guide member in a state in which the flow adjusting device is oriented in the third position.

Referring to FIGS. 6 to 8, based on the operation of the guide member 40, the flow adjusting device 30 may be oriented in the first position in which the top surface of the flow adjusting device 30 is horizontal with the top surface of the second blower 20, may be oriented in the second position in which the top surface of the flow adjusting device 30 has the predefined angle with respect to the top surface of the second blower 20, and may be oriented in the third position in which the top surface of the flow adjusting device 30 is perpendicular to the top surface of the second blower 20.

FIG. 6 illustrates that a portion of the side panel 305 of the flow adjusting device 30 is inserted into the second casing 200 when the flow adjusting device 30 is oriented in the first position, but the concept of the present disclosure is not necessarily limited thereto. That is, the side panel 305 of the flow adjusting device 30 may not be inserted into the second casing 200, or entirety of the side panel 305 of the flow adjusting device 30 may be inserted into the second casing 200.

Further, FIG. 8 illustrates that a portion of the front casing 300 and a portion of the side panel 305 of the flow adjusting device 30 are inserted into the second casing 200 when the flow adjusting device 30 is oriented in the third position, but the concept of the present disclosure is not necessarily limited thereto. That is, the portion of the front casing 300 and the portion of the side panel 305 of the flow adjusting device 30 may not be inserted into the second casing 200.

As described above, the air cleaner 1 according to exemplary embodiments of the present disclosure may include the sequentially stacked blowers 10 and 20, the guide member 40, and the flow adjusting device 30, and the guide member 40 may include the plurality of gears 423, 425, 433, 435, 437, and 443 arranged inside the guide member 40 and configured to be rotatable. Some of the plurality of gears 423, 425, 433, 435, 437, and 443 may be connected to each other to be rotatable in engagement with each other. The flow adjusting device 30 may be configured to change the discharge direction of the air by the rotations of the plurality of gears 423, 425, 433, 435, 437, and 443 of the guide member 40.

In this connection, the angle formed between the top surface of the flow adjusting device 30 and the top surface of the blower 10 and 20 may increase or decrease based on the rotation operations of the plurality of gears 423, 425, 433, 435, 437, and 443. Thus, the orientation of the flow adjusting device 30 may be changed from the first position in which the top surface of the flow adjusting device 30 is horizontal with the top surface of the blower 10 and 20 to the third position in which the top surface of the flow adjusting device 30 is perpendicular to the top surface of the blower 10 and 20.

Therefore, the top surface of the flow adjusting device 30 may be oriented to be perpendicular to the top surface of the blower 10 and 20. Thus, the air discharged from the blower 10 and 20 may be blown farther away in the desired direction through the flow adjusting device 30.

In addition, the guide member 40 according to exemplary embodiments of the present disclosure may have a stable and improved appearance because, compared to a driving scheme of the conventional guide member configured to be movable by being inserted into the blower or withdrawn from the top surface of the blower, not only more concise and natural driving is possible, but also a structure for driving the guide member 40 is not exposed to the outside.

Although various embodiments of the present disclosure have been described above in detail, those having ordinary knowledge in the technical field to which the present disclosure belongs may realize that various modifications may be made to the above-described embodiment as long as they do not depart from the scope of the present disclosure. Therefore, the scope of rights of the present disclosure should not be limited to the described embodiment and should be determined not only by the claims to be described later but also by equivalents thereto.

INDUSTRIAL APPLICABILITY

The present disclosure can provide an air cleaner.

The invention claimed is:

1. An air cleaner comprising:
   a blower configured to inhale air from an outside, filter the inhaled air, and discharge the filtered air;
   a flow adjusting device disposed above the blower and configured to inhale the filtered air discharged from the blower, adjust a discharge direction of the inhaled filtered air, and discharge the filtered air in the adjusted discharge direction; and
   a guide member disposed below the flow adjusting device and configured to change a state of the flow adjusting device,
   wherein the guide member includes:
      a guide connector coupled to the flow adjusting device to enable the flow adjusting device to rotate;
      a housing disposed above the blower, connected to the guide connector, and movable up and down to guide ascending or descending of the flow adjusting device;
      a housing gear assembly rotatably provided within the housing to move the housing up and down by rotation; and
      a guide gear assembly rotatably provided within the housing to rotate independently of the housing gear assembly and coupled to the guide connector, and
   wherein the flow adjusting device is configured to change the discharge direction of the filtered air by rotation of the guide gear assembly.

2. The air cleaner of claim 1, wherein the flow adjusting device is movable between a first position, a second position, and a third position, based on a movement of the guide member,
   wherein in the first position, an upper surface of the flow adjusting device is parallel with an upper surface of the blower,
   wherein in the second position, the upper surface of the flow adjusting device forms a predefined acute angle with respect to the upper surface of the blower, and
   wherein in the third position, the upper surface of the flow adjusting device is perpendicular to the upper surface of the blower.

3. The air cleaner of claim 1, wherein the housing includes:
   a first housing disposed on an upper surface of the blower; and
   a second housing coupled to the first housing to be moved up and down.

4. The air cleaner of claim 3, wherein the housing gear assembly further includes:
   a housing actuator disposed inside the first housing;
   a first housing gear configured to rotate by the housing actuator; and
   a second housing gear configured to rotate by engagement with the first housing gear.

5. The air cleaner of claim 4, wherein the first housing gear and the second housing gear rotate in opposite directions to each other.

6. The air cleaner of claim 5, wherein the second housing gear is coupled to the second housing, and wherein as the second housing gear rotates, the second housing pivots in a same direction that the second housing gear rotates.

7. The air cleaner of claim 4, wherein as the second housing pivots about the second housing gear, the flow adjusting device ascends or descends.

8. The air cleaner of claim 3, wherein the guide gear assembly further includes:

a guide actuator disposed inside the second housing;

a first guide gear configured to rotate by the guide actuator; and a second guide gear configured to rotate by engagement with the first guide gear.

9. The air cleaner of claim 8, wherein the first guide gear and the second guide gear rotate in opposite directions to each other.

10. The air cleaner of claim 8, wherein the second guide gear is coupled to the guide connector, and wherein as the second guide gear rotates, the guide connector rotates in a same direction as the second guide gear rotates.

11. The air cleaner of claim 10, wherein the guide gear assembly further includes an idler gear disposed between the first guide gear and the second guide gear, the idler gear being in rotatable engagement with the first guide gear and the second guide gear.

12. The air cleaner of claim 11, wherein the first guide gear and the second guide gear rotate in the same direction with each other, and wherein the idler gear rotates in an opposite direction to the direction the first guide gear and the second guide gear rotate.

13. The air cleaner of claim 3, wherein the guide connector is rotatably coupled to a bottom surface of the flow adjusting device and to a portion of the second housing.

14. The air cleaner of claim 3, wherein the housing gear assembly is disposed inside the first housing to connect the first housing to the second housing, and wherein the housing gear assembly includes a plurality of housing gears.

15. The air cleaner of claim 3, wherein the guide gear assembly is disposed inside the second housing to connect the second housing to the flow adjusting device, wherein the guide gear assembly includes a plurality of guide gears, and wherein the flow adjusting device pivots about the guide connector by rotation of the guide gear assembly.

16. The air cleaner of claim 1, wherein the housing gear assembly and the guide gear assembly operate simultaneously.

17. The air cleaner of claim 1, wherein the blower includes a guide member seating portion for seating the housing, and wherein the guide member seating portion has a ring shape and a central hole.

18. The air cleaner of claim 17, wherein the guide member further includes a direction adjusting gear assembly disposed to connect the housing to the blower, wherein the direction adjusting gear assembly includes:

a direction adjusting gear that is rotatable in a direction different from the housing gear assembly and the guide gear assembly; and a guide ring disposed along a circumferential surface of the guide member seating portion such that the direction adjusting gear is rotatable by engagement with the guide ring.

19. The air cleaner of claim 18, wherein the flow adjusting device moves along a circumferential direction of the guide member seating portion by the direction adjusting gear assembly.

20. The air cleaner of claim 1, wherein the blower includes a first blower configured to inhale the air, filter the inhaled air, and discharge the filtered air at a first vertical height, and a second blower disposed on a top surface the first blower and configured to inhale air, filter the inhaled air, and discharge the filtered air at a second vertical height higher than the first vertical height, wherein the first blower includes a first casing, a first filter member disposed in a lower portion of an interior of the first casing to filter the air, and a first blow fan disposed in an upper portion of the interior of the first casing to generate air flow, wherein the second blower includes a second casing, a second filter member disposed in a lower portion of an interior of the second casing to filter the air, and a second blow fan disposed in an upper portion of the interior of the second casing to generate air flow, and wherein the guide member is disposed between the second blow fan and the flow adjusting device.

* * * * *